United States Patent [19]

Mayhugh

[11] Patent Number: 5,416,965
[45] Date of Patent: May 23, 1995

[54] ON-SITE METHOD OF INSTALLING REPLACEMENT GLASS IN A VEHICLE

[76] Inventor: Kent R. Mayhugh, N96 W16427 County Line Rd., Menomonee Falls, Wis. 53051

[21] Appl. No.: 10,752

[22] Filed: Jan. 29, 1993

[51] Int. Cl.6 .............. B23P 6/00; B62D 33/08; E04H 15/06
[52] U.S. Cl. .............. 29/402.08; 29/401.1; 29/DIG. 24; 296/26; 296/161
[58] Field of Search .............. 29/401.1, 402.01, 402.03, 29/402.08, 404, 405, 428, 722, DIG. 21, DIG. 24; 156/94; 52/63, 206, 207, 208, 823; 135/88, 92, 89, 103, 107, 108, 109, 118, 119, 120, 904; 160/66, 33; 296/26, 160–163

[56] References Cited

U.S. PATENT DOCUMENTS

| | | | |
|---|---|---|---|
| 2,793,646 | 5/1957 | Lefebvre | 135/118 X |
| 3,019,803 | 2/1962 | Moody | 135/88 |
| 3,463,174 | 8/1969 | Heller | 160/330 X |
| 3,579,798 | 5/1971 | Henderson | 29/402.08 |
| 3,620,524 | 11/1971 | Czompi | 29/281.4 X |
| 3,707,977 | 1/1973 | Grady | 135/904 X |
| 3,765,975 | 10/1973 | Hollingsworth | 156/94 |
| 3,923,336 | 12/1975 | Price, Sr. | 296/161 |
| 3,968,809 | 7/1976 | Beavers | 135/88 |
| 4,336,644 | 6/1982 | Medlin | 29/401.1 |
| 4,457,553 | 7/1984 | Larkin | 296/160 |
| 4,683,902 | 8/1987 | Wilson | 135/88 X |
| 4,754,774 | 7/1988 | Leader | 160/66 X |
| 4,799,343 | 1/1989 | Gold | 52/823 X |
| 4,886,411 | 12/1989 | Pieperhoff et al. | 135/88 X |

*Primary Examiner*—Peter Dungba Vo
*Attorney, Agent, or Firm*—Andrus, Sceales, Starke & Sawall

[57] ABSTRACT

An enclosure system for use in on-site installation of vehicle glass includes a stationary frame for mounting to the roof of a conventional van, and a movable frame adapted for movement relative to the stationary frame. The movable frame is movable between a storage position and an extended position, in which it is positioned over the vehicle in which glass is to be installed. A curtain is mounted to a channel track system associated with the movable frame, for enclosing the portion of the vehicle in which the glass is to be installed. The movable frame includes a series of transparent panels, which cooperate with the curtain to define a temporary enclosure about a portion of the vehicle. A heater is employed to heat the enclosure in the event the ambient temperature is too low to allow a glass installation to take place. The transparent panels function to keep precipitation off the vehicle.

10 Claims, 3 Drawing Sheets

ON-SITE METHOD OF INSTALLING REPLACEMENT GLASS IN A VEHICLE

BACKGROUND AND SUMMARY

This invention pertains to an enclosure, and more particularly to a vehicle-mounted enclosure and method for installation of auto glass or the like in a vehicle.

In repairing and replacing vehicle glass such as windshields or the like, it has become increasingly common for the repair installation to take place at the site of the vehicle. This procedure involves minimal inconvenience on the part of the vehicle's owner. However, on-site installations can only take place in good weather, i.e. and when the temperature is above a certain level and precipitation is absent. Accordingly, in seasonal climates, on-site installation generally cannot take place during the late fall, winter and early spring months.

It is an object of the present invention to provide an enclosure system and method for enabling on-site vehicle glass installations to take place during any weather. It is a further object of the invention to provide an on-site enclosure and method adapted for use in connection with a conventional vehicle such as a van. Yet another object of the invention is to provide an enclosure which is relatively simple in its construction and operation., and which can be easily and quickly mounted to a conventional vehicle and which provides ease of operation.

In accordance with the invention, an on-site glass installation enclosure includes a stationary frame structure for mounting to the top of a van or the like, and a movable frame structure movably mounted to the stationary frame structure The movable frame includes a series of interconnected frame members, including a pair of spaced side members between which front and rear end members extend. One or more support legs are mounted to the rear end member. A curtain track is mounted to the end members and the side members, and a curtain is suspended from and movably mounted to the curtain track. The enclosure system is movable between a retracted storage position in which the movable frame is moved on the stationary frame so as to be located over the vehicle, and in which the one or more legs are located closely adjacent the rear of the vehicle. In this position, the curtain is tucked between the movable frame and the roof of the vehicle. The system is movable to an extended position in which the movable frame is moved on the stationary frame rearwardly of the vehicle. The legs are engageable with the ground to support the rear end of the movable frame, and the front end of the movable frame is supported by the stationary frame. When the system is in its extended position, the curtain is allowed to fall by gravity toward the ground, and the lower extent of the curtain is in close proximity to the ground. The curtain is then moved along the curtain track. so as to define an enclosed volume. A series of panels, such as transparent plexiglass panels, are mounted to the movable frame, for completely enclosing the volume defined by the curtain and for permitting light to enter the enclosure. therethrough.

In accordance with the method of the invention, the vehicle to which the enclosure system is mounted is positioned. adjacent the front or rear of the vehicle in which the glass is to be installed, depending on the location of the glass to be installed. The movable frame is then drawn from its retracted storage position rearwardly over the vehicle, and the legs mounted to the rear end frame member are located one on either side of the vehicle. The curtain is then mowed on the curtain track such that opposite ends of the curtain engage the sides of the vehicle. The upper portions of the curtain ends are moved over the top of the vehicle, and are temporarily secured together. The opening of the vehicle within which the replacement glass is to be installed is thus located within the interior of the enclosure defined by the curtain. A heater is placed within the enclosure to heat the interior of the enclosure. once the interior of the enclosure is heated, the repair glass installation can be carried out without concern for the weather, in that the interior of the enclosure is heated and precipitation is kept out of the enclosure by the panels mounted to the movable frame. The transparency of the panels allows the interior of the enclosure to be lighted, and the curtain is also constructed of a translucent material allowing ambient light into the interior of the enclosure.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
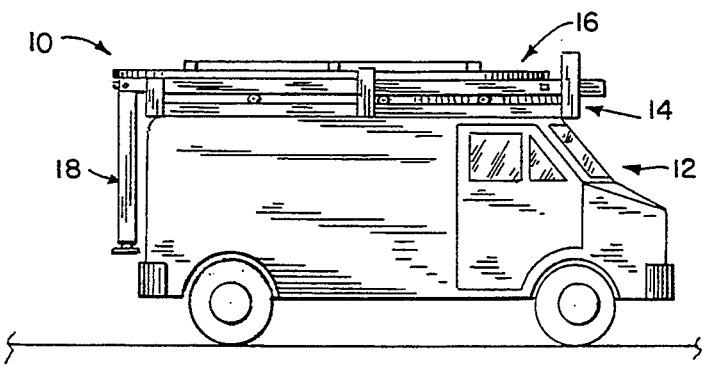
FIG. 1 is a side elevation view of a van to which the enclosure system of the invention has been mounted, showing the movable frame in its retracted storage position.

FIG. 1 illustrates an enclosure system 10 constructed according to the invention mounted to the roof of a conventional van 12. Van 12 is of the type typically used in on-site installations of vehicle glass, such as front and/or rear windshields for automobiles or trucks.

Figure 2:
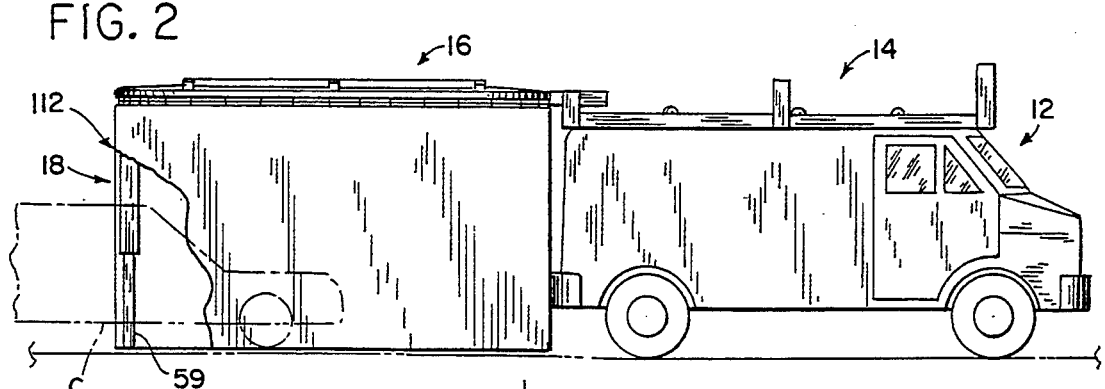
FIG. 2 is a view similar to FIG. 1, showing the movable frame in its extended position over one end of a vehicle, with the curtain being suspended by the movable frame.

As shown in FIG. 2, enclosure system 10 generally includes a stationary frame structure 14 and a movable frame structure 16. In a manner to be explained, movable frame 16 is mounted to stationary frame 14 for movement between a retracted, inoperative storage position as illustrated in FIG. 1 and an extended, operative position as illustrated in FIG. 2. In its extended position, movable frame 16 is supported by a pair of support leg assemblies, one of which is shown at 18. A curtain, shown generally at 20, is suspended from movable frame 16 in a manner to be explained, when movable frame 16 is moved to its extended position.

Figure 4:
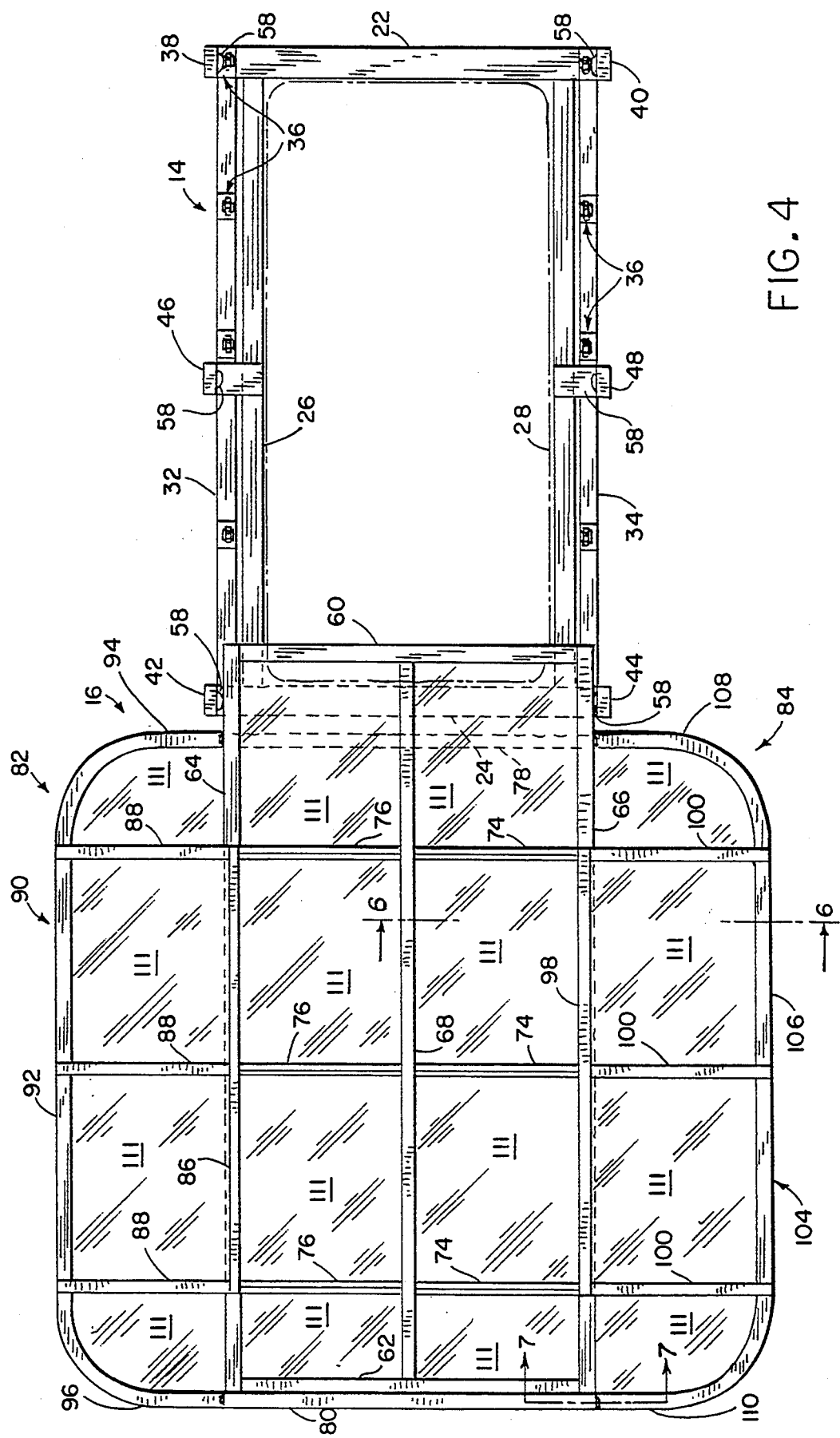
FIG. 4 is a view similar to FIG. 3, showing the movable frame of the enclosure system of FIG. 1 in its extended position.
Figure 5:
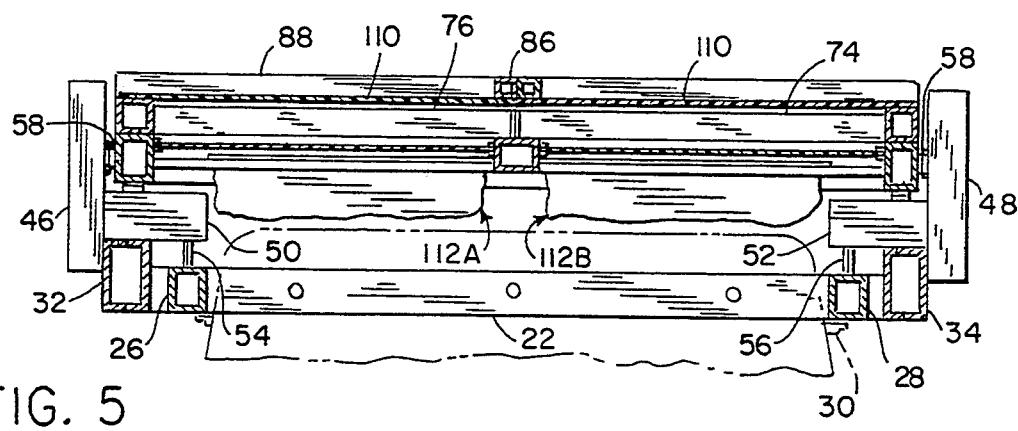
FIG. 5 is a partial section view taken along line 5—5 of FIG. 3.

Referring to FIGS. 4 and 5, stationary frame 14 consists of a pair of spaced end members 22, 24 and a pair of spaced inner side members 26, 28 extending between and interconnected with end members 22, 24. End members 22, 24 and inner side members 26, 28 are spaced so as to fit over the top of van 12, and rest upon the drip rail of van 12, shown in FIG. 5 at 30. Stationary frame 14 is retained in place on van 12 in any satisfactory conventional manner, such as by means of wires (not shown) extending between eyes mounted to one or more of frame members 22–28 and to external structural components of van 12, such as hinges or the like.

Stationary frame 14 further includes a pair of outer side members 32, 34 which extend between and interconnect the ends of end members 22, 24.

Stationary frame members 22–28, 32 and 34 are preferably constructed of conventional hollow rectangular anodized aluminum members, to provide resistance to corrosion.

A series of inverted caster assemblies 36 are mounted to the upper surfaces of outer side members 32, 34. Each caster assembly 36 defines an upwardly facing rotatable wheel and a base plate which is bolted to outer side members 32, 34.

Stationary frame 14 further includes front vertical members 38, 40 extending upwardly from the ends of front end member 22, rear vertical members 42, 44 extending upwardly from the ends of rear end member 24, and a pair of intermediate vertical members 46, 48. As shown in FIG. 5, short cross-members 50, 52 are mounted to the lower ends of intermediate vertical members 46, 48, respectively, extending inwardly therefrom. The lower surface of each of cross members 50, 52 rests on and is supported by the upper surface of outer side members 32, 34, respectively, and the inner ends of cross members 50, 52 are mounted to inner side members 26, 28 through bolts 54, 56 respectively Wheels 58, rotatable about a vertical axis, are mounted to each of vertical members 38, 40, 42, 44, 46 and 48.

Figure 3:
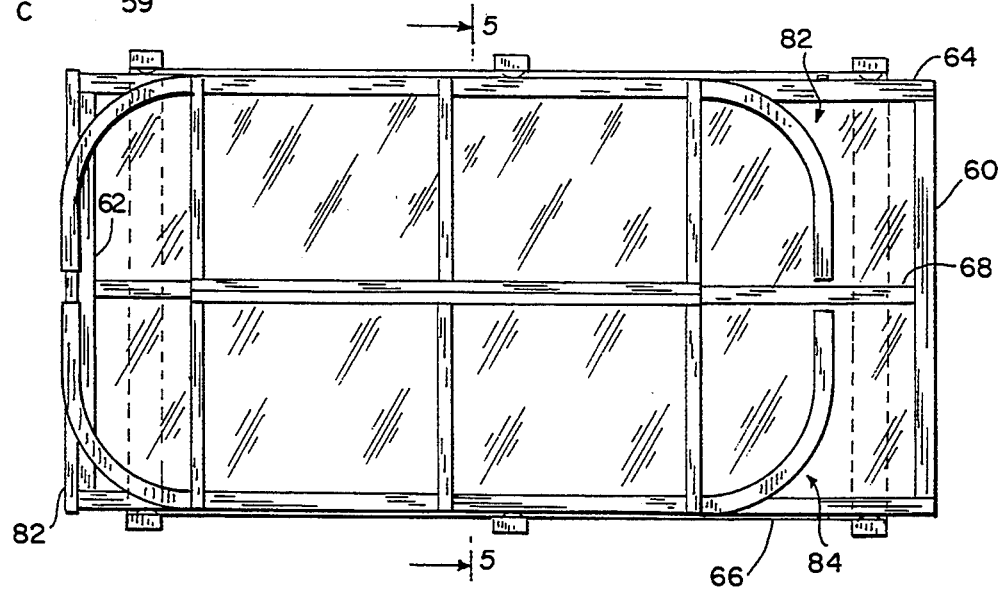
FIG. 3 is a top plan view of the enclosure system of FIG. 1 in its storage position.

Referring to FIGS. 2, 3 and 4, leg assemblies 18 are mounted to ]movable frame 16. Each leg assembly includes a telescoping extendible and retractable lower portion 59. Movable frame 16 further includes-a pair of end members 60, 62 and a pair of spaced side members 64, 66 extending between and interconnected at their ends with the ends of end members 60, 62. A central frame member 68 extends between and is interconnected with the mid-point of each of end members 60, 62. A series of cross members 70 extend between and interconnect central frame member 68 with side frame member 66. Similarly, a series of cross members 72 extend between and interconnect central frame member 68 with side frame member 64. U-shaped track members 74 are mounted to the upper surface of each of cross members 70, and U-shaped track members 76 are mounted to the upper surface of each of cross members 72.

A downwardly facing front channel track 78 extends between and is interconnected with side frame members 64, 66 rearwardly of front end member 60. Similarly, a downwardly facing rear channel track 80 is mounted to rear end member 62.

Referring to FIGS. 3 and 4, a pair of wing frame assemblies 82, 84 are mounted to movable frame assembly 16. Wing frame assemblies 82, 84 are movable between a retracted, storage position as shown in FIG. 3 and an extended, operative position as shown in FIG. 4.

Wing frame assembly 82 includes a longitudinal frame member 86 to which three lateral frame members 88 are mounted. Inverted track members (not shown) are mounted to the lower surface of each of lateral frame members 88, and are slidably engaged with channel track members 76 mounted to cross members 70 of movable frame 16. An inverted U-shaped channel track 90 is mounted to the lower surface of each of lateral frame members 88 at the outer ends of lateral frame members 88. Channel track 90 defines an elongated front-rear section 92, a transverse front section 94 and a transverse rear section 96.

Figure 6:
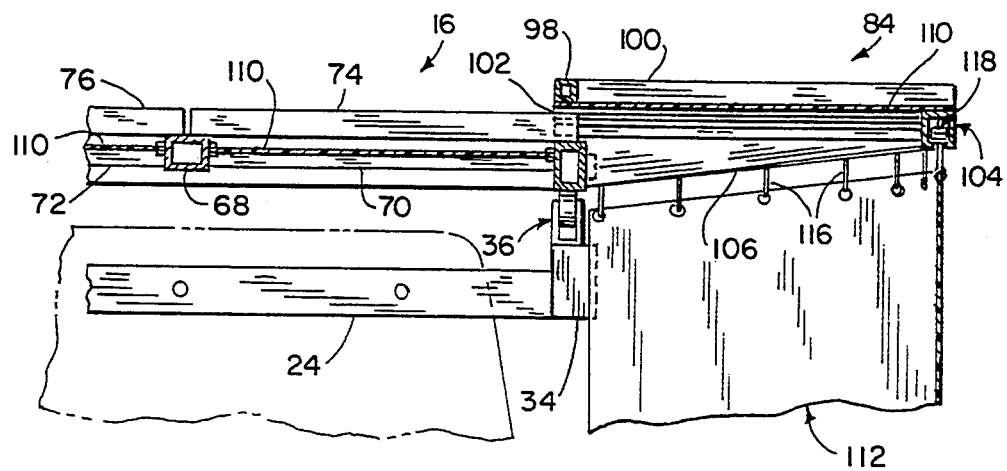
FIG. 6 is a partial section view taken along line 6—6 of FIG. 4.

Similarly, wing frame assembly 84 includes a longitudinal frame member 98 and a series of lateral frame members 100. Channel track sections 102 (FIG. 6) are mounted to the lower surface of each of lateral frame members 100. Each channel track section 102 is slidably mounted to one of inverted channel track members 74 mounted to cross members 72 of movable frame 16. A U-shaped channel track 104 is mounted to the outer end of each of lateral frame members 96. Channel track 104 includes a front-rear section 106, a transverse front section 108, and a transverse rear section 110.

A series of flexible transparent plexiglass panels, all of which are shown at 111, are interconnected with the frame members and channel track sections of movable frames 16 and wing frame assemblies 82, 84, in the spaces defined between such members.

Figure 7:
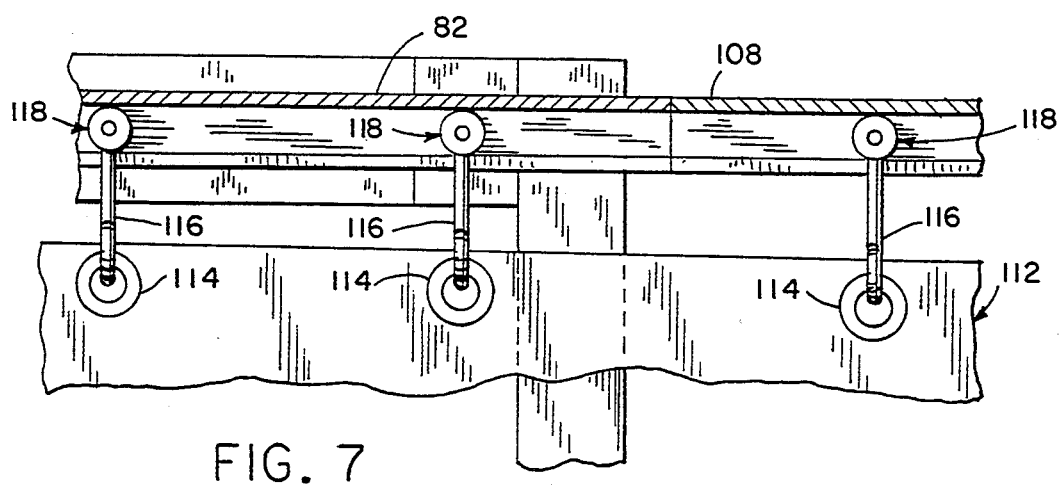
FIG. 7 is a partial section view taken along line 7—7 of FIG. 4.

A flexible curtain 112 is interconnected with movable frame 16. Curtain 112 is defined by two sections. Each section of curtain 112 includes a series of spaced grommets 114 located adjacent its upper end. Curtain 112 is suspended from a series of hangers or hooks 116, the lower end of which extend through grommets 114. The upper end of each hook 116 is mounted to a roller assembly 118 (FIG. 7). Roller assemblies 118 are received within the channel defined by channel tracks 90, 104 of wing frame assemblies 82, 84, respectively, and by front and rear channel track sections 78, 80 of movable frame 16. In this manner, curtain 112 can be drawn about the entire periphery defined by channel tracks 78, 80, 90, 104 to define an enclosed volume.

In operation, enclosure system 10 functions as follows. During transport to the installation site, or when enclosure system 10 is otherwise not in use, enclosure system 10 is moved to its retracted, storage position as shown in FIGS. 1, 3 and 5. In this position, wing frame assemblies 82, 84 are in their storage positions, and likewise movable frame 16 is in its storage position. The two sections of curtain 112, shown in FIG. 5 at 112a, 112b, are tucked between the roof of van 12 and movable frame 16. Curtain sections 112a, 112b are gathered together below front channel track 78, with the roller assemblies 118 of curtain sections 112a, 112b being disposed within the channel defined by front channel track 78. After van 12 has arrived at the installation site, van 12 is backed into position adjacent the end of automobile C (FIG. 2) where the replacement glass is to be installed, The operator then grasps rear end member 62 of movable frame 16, and/or leg assemblies 18 and pulls rearwardly, resulting in rearward movement of movable frame 16 relative to stationary frame 14. Inverted caster assemblies 36 and wheels 58 facilitate the movement of movable frame 16 off of stationary frame 14. When movable frame 16 has been withdrawn from stationary frame 14 to its desired position as shown in FIG. 4, the extendible lower portions 59 of leg assemblies 18 are lowered such that the lower end of each extendible portion engages the ground. A variable position connection arrangement, such as a bolt and a series of openings, are provided between the upper portions of legs 18 and the extendible portion 59 of each leg 18. In this manner, when the desired height of leg 112 is attained, the position of extendible portion 120 is fixed to support movable frame 16 at a desired elevation about the ground. Legs 18 are located one on either side of automobile C, so that movable frame 16 is located over the portion of automobile C in which glass is to be installed. Wing frame assemblies 82, 84 are then moved to their extended positions, as shown in FIG. 4 by outward sliding movement of wing frame assemblies 82, 84 on inverted track sections 74, 76 of movable frame 16. When wing frame assemblies 82, 84 are in their extended positions, the ends of front and rear channel track sections 94, 96 of channel track 90 are moved downwardly into alignment with the ends of front and rear channel tracks 78, 80. Similarly, the ends of front and rear sections 108,. 110 of channel. track 104 are moved downwardly into alignment with the ends of front and rear channel tracks 78, 80, respectively (as shown in FIG. 7).

As movable frame 16 is moved rearwardly on stationary frame 14, curtain sections 112a, 112b are withdrawn from between the roof of van 12, and movable frame 16 so that, when movable frame 16 is fully withdrawn from stationary frame 14, curtain sections 112a, 112b are suspended from front channel track 78. Once the ends of front channel track sections 94, 96 are in alignment with the ends of front channel track 78, curtain sections 112a, 112b are moved by roller assemblies 118 onto channel tracks 90, 104, and rearwardly along front-rear channel track sections 92, 106. The ends of curtain sections 112a, 112b are then drawn around channel tracks 90, 104 to rear sections 96, 108, and onto rear channel track 80. When the lower portion of the curtain ends engages the side of automobile C, the upper portion of the curtain section ends continues to be drawn together on rear channel track 80 over automobile C. The curtain ends are then temporarily secured together in any satisfactory manner, to enclose the portion of automobile C in which the replacement glass is to be installed. The opposite ends of curtain sections 112a, 112b are located on front channel track 78, and remain in close proximity to each other.

A conventional propane heater is then placed within the enclosed volume defined by curtain sections 112a, 112b and movable frame 116. The heater is operated to generate heat within the enclosed volume, to elevate the temperature in the vicinity of the glass installation on automobile C. Transparent panels 111 serve the function of preventing entry of precipitation into the enclosed volume while retaining heat therewithin, and also allowing light to enter into the enclosed volume. Curtain sections 112a, 112b are preferably constructed of a translucent material, to also allow ambient light to enter into the enclosed volume.

Once the replacement glass installation is complete, the above steps are reversed to move movable frame 16 back to its storage position of FIG. 1.

Various alternatives and embodiments are contemplated as being within the scope of the following claims particularly pointing out and distinctly claiming the subject matter regarded as the invention.

I claim:

1. An on-site method of installing replacement vehicle glass in a vehicle, comprising the steps of:

enclosing at least a portion of the vehicle by positioning a frame structure over at least a first portion of the vehicle in which the replacement glass is to be installed; movably mounting a curtain structure on the frame structure; and moving the curtain structure on the frame structure to engage the vehicle and to enclose the first portion of the vehicle;

heating the air adjacent the first portion of the vehicle; and installing replacement glass in the vehicle.

2. The method of claim 1, wherein the step of positioning a frame structure over at least a first portion of the vehicle comprises mounting a movable frame assembly to a second vehicle, the movable frame assembly defining a first end and a second end; moving the movable frame assembly relative to the second vehicle such that the frame assembly is positioned over the first portion of the first-mentioned vehicle; supporting a first end of the movable frame assembly by means of the second vehicle; and supporting a second end of the movable frame assembly above the ground by means of a pair of legs located one on either side of the first-mentioned vehicle.

3. The method of claim 2, further comprising the steps of mounting a pair of laterally movable wing frame assemblies to the movable frame assembly, and moving the wing frame assemblies laterally relative to the movable frame assembly when the movable frame assembly is positioned over the first portion of the first-mentioned vehicle, and engaging the curtain structure with the wing frame assemblies.

4. The method of claim 2, wherein the step of movably mounting the curtain structure to the movable frame structure comprises mounting peripheral track structure to the movable frame assembly, and engaging the curtain with the peripheral track structure by means of a series of rollers from which the curtain structure is suspended, with the rollers being engaged with the peripheral track structure.

5. A method of installing replacement glass in a first vehicle, comprising the steps of:

mounting a movable frame structure to a second vehicle, the movable frame structure being movable rearwardly relative to the second vehicle between a retracted inoperative position and an extended operative position;

positioning the second vehicle adjacent the first vehicle;

moving the movable frame structure to its extended position over the first vehicle;

mounting a curtain structure to the movable frame structure;

moving the curtain structure relative to the frame structure to enclose at least a portion of the first vehicle by means of the curtain structure in combination with the movable frame structure; and installing replacement glass in the enclosed portion of the first vehicle.

6. The method of claim 5, further comprising the step of mounting one or more translucent panels to the movable frame structure.

7. The method of claim 5, wherein the step of mounting a curtain structure to the movable frame structure comprises mounting peripheral track structure to the movable frame structure, and engaging the curtain structure with the peripheral track structure.

8. The method of claim 7, wherein the step of providing peripheral track structure comprises movably mounting a pair of wing frame assemblies for lateral movement relative to the movable frame structure, the wing frame assemblies each including a track section defining first and second ends, wherein the first and second ends of the wing frame assembly track structures face each other, with the movable frame assembly located therebetween.

9. The method of claim 8, further comprising the step of mounting a pair of track sections to the movable frame assembly between the facing ends of the first and second wing frame assembly track sections, and positioning the wing frame assembly track section ends so as to abut the ends of the track sections mounted to the movable frame assembly.

10. The method of claim 9, further comprising the step of suspending the curtain structure solely by a first one of the track sections when the movable frame structure is moved to its retracted inoperative position.

* * * * *